Aug. 19, 1958    E. A. SCHUMACHER ET AL    2,848,525
MINIATURE ALKALINE CELL
Filed Sept. 21, 1953
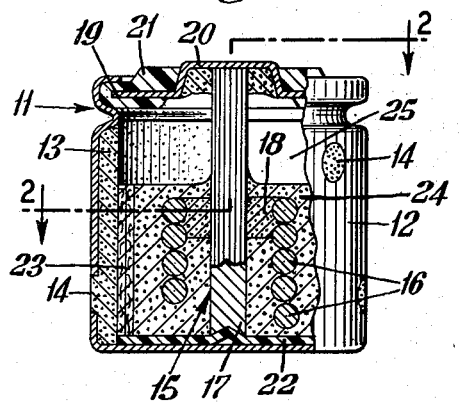
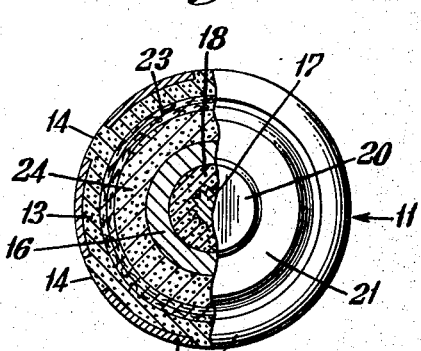
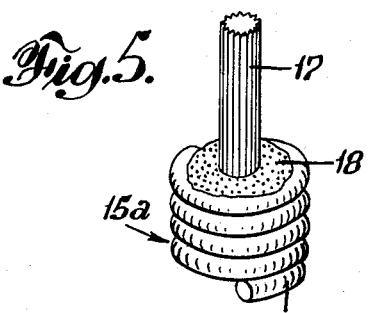
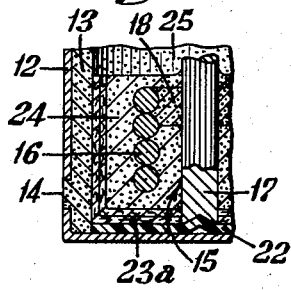
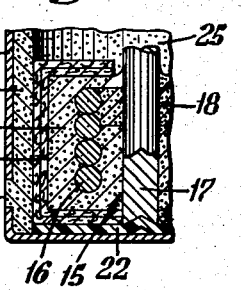
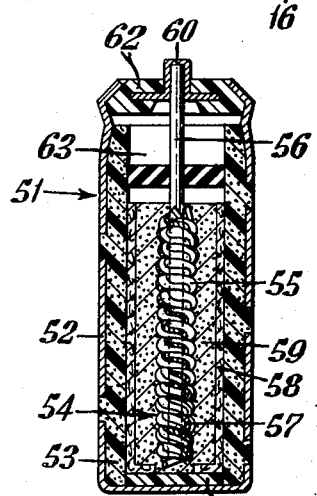
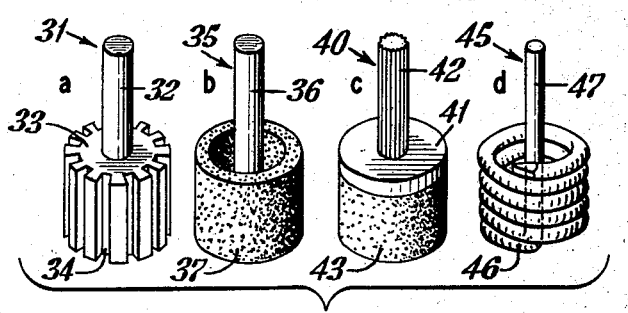
INVENTORS
ERWIN A. SCHUMACHER
ROSWELL J. BENNETT
BY *John F. Hohmann*
ATTORNEY

United States Patent Office 2,848,525
Patented Aug. 19, 1958

2,848,525
MINIATURE ALKALINE CELL

Erwin A. Schumacher, Parma, and Roswell J. Bennett, Lakewood, Ohio, assignors to Union Carbide Corporation, a corporation of New York Application September 21, 1953, Serial No. 381,164

10 Claims. (Cl. 136—102)

This invention relates to air-depolarized primary galvanic cells having an improved capacity per unit of volume and refers more particularly to very small cells of this type.

Because of the excellent electrical characteristics of air-depolarized primary cells, notably their relatively constant voltage on discharge, their use in many electronic devices is recommended. Efficiency demands that the cells have a high capacity. The development of such devices as hearing aids has created a demand for smaller power sources, and this development has accentuated the requirement of high capacity while limiting the volume available for the cell.

It is the principal object of this invention to provide an air-depolarized primary galvanic cell having a high ampere-hour capacity per unit of volume. A further object is to provide an improved miniature air-depolarized primary galvanic cell.

The cell of the invention, which in miniature form has proved to be particularly well suited for use in small compact electronic devices, has been made possible by novel concepts of construction, particularly cathode and anode construction. The cathode of the cell of the invention comprises a carbon composition, described more particularly below, which lines a metal container and surrounds the anode. The metal container not only serves as a backing for the cathode material but also acts as one of the terminals of the cell. The anode is a result of the discovery that a roughened or curved zinc surface, as distinguished from a plane surface, readily frees itself from otherwise adherent zinc oxide scale, permitting the anode to operate over a wide range of current densities and use frequency with minimum polarization. Particularly good results have been obtained with certain anodes fabricated from zinc wire and described below.

In the accompanying drawing:

Fig. 1 is a vertical elevation, partially in section, of a cell embodying the invention;

Fig. 2 is a top view partially in section along the line 2—2 of the cell of Fig. 1;

Fig. 3 is a sectional view similar to Fig. 1 of a modified form of cell embodying the invention, part being broken away;

Fig. 4 is a view similar to Fig. 3 of another modification of a cell embodying the invention;

Fig. 5 is an enlarged view of an anode assembly used in the cells of Figs. 1 to 4, inclusive;

Figs. 6a, b, c, and d are views of modified anode assemblies suitable for use in the cells shown in Figs. 1 to 4, inclusive;

Fig. 7 is a vertical elevation, partially in section, of another cell embodying the invention; and Fig. 8 is an enlarged view of an anode assembly suitable for use in the cell of the invention and similar to the anode assembly in the cell shown in Fig. 7.

In the cell 11 shown in Fig. 1, a perforated, metal cup 12 serves as a container. This container is suitably of steel which has been nickel plated to minimize corrosion. Lining the container 12 is a carbon cathode 13 which covers the perforations or apertures of the container 12 as shown at 14. The carbon cathode 13 consisting of a bonded carbon, preferably formed in situ, will be discussed more in detail below.

An anode 15, positioned within said container 12 and said carbon cathode 13, consists of a helically wound zinc wire 16 which is electrically connected to a stud 17 suitably by means of pressed zinc powder 18. One end of the stud 17 is in electrical contact with a closure member 19 which may function as a terminal 20. The closure member 19 is insulated from the container 12 by a plastic seal 21 suitably of ethyl cellulose or a vinyl resin. The lower end of the stud 17 is insulated from the container by a plastic washer 22, suitably of nylon or a vinyl resin.

A separator 23 is placed between the anode 15 and carbon cathode 13 in contact with the carbon cathode 13. The separator 23 may be cylindrical as in Fig. 1 or extend along the bottom of the cell as does separator 23a in Fig. 3, or substantially enclose the anode 15 as does the separator 23b of Fig. 4. Remarkably improved results have been obtained with separators such as those shown in Figs. 3 and 4. This is believed to be due to the prevention of the internal shorting of the cell by reaction products. By extending the separator along the bottom of the cell output of the cell is increased as much as 30% to 50% over that obtained with the conventional cylindrical separator. A preferred separator is made of a sorbent, porous paper of the regenerated cellulose type.

The electrolyte 24, which will be described in detail below, is disposed around the anode 15 filling the space in the cell to within a short distance from the top of the cell. An air space 25 into which the carbon cathode 13 extends is provided above the electrolyte 24 for the proper venting of the cell.

The cell shown in Fig. 7 is similar in construction and operation to the cell shown in Fig. 1. Differences in proportions permit the use of the cell 51 of Fig. 7 in equipment for which the minimum dimension of cell 11 renders it unsuitable. In cell 51, a perforated metal container 52, preferably nickel plated steel, is lined with a carbon cathode 53. An anode 54 comprises a zinc wire 55 wound spirally around a metallic, preferably copper, stud 56. For best results a copper wire 57 is incorporated in the anode. A separator 58, preferably of the material described with respect to separator 23, is placed between the anode 54 and cathode 53.

The space around the anode 54 is filled with electrolyte 59. The upper end of the stud 56 which extends toward the open end of the container 52 engages a metallic closure member 60 which serves as a terminal for the anode. The end of the container 52 is crimped and sealed with a plastic material 62. An air space 63 is provided above the electrolyte 59. A plastic insert 64 is placed between the bottom of the container 52 and the anode 54. The manner in which an anode suitable for use in the cell 51 may be constructed is illustrated by Fig. 8. In Fig. 8 a portion of an anode is shown which comprises strands of zinc wire 71 and a copper wire 72 wound together.

The cell of the invention is to be of the air-depolarized type. Accordingly, a suitable grade of carbon should be employed in fabricating the cathode to insure the efficient air-depolarization of the cell. The cathode is exposed on one side to the air through the perforations in the container and on the other side to the moistened separator. Under these conditions a certain degree of moisture impermeability or repellency is required. The preferred cathode comprises granular, air-depolarizable carbon bonded together with a thermoplastic binder. Best results have been obtained with petroleum-base waxes. The preferred wax is a micro-crystalline petroleum-base wax having a melting point of about 172° F. Waxes having a higher or a lower melting point may of course be used. No more than about 40% by weight wax is needed to impart the desired strength to the cathode material. To the cathode composition up to about 20% by weight of a metal soap, preferably barium stearate, should be added to insure adequate water repellency and improve the molding properties of the composition.

The cathode composition may be molded and placed in the container, or applied to the container, for example, by first melting the wax in the composition and then employing dipping or spraying operations. Solvents for the wax which are later removed are also a satisfactory means of rendering the cathode composition amenable to application by spraying or dipping. The preferred manner of fabricating the cathode is to place a small quantity of a carbon-wax-soap mix in the bottom of a container and by driving a suitable plunger into the container cause the composition to extend upward along the sides of the container. The cathode composition of the preferred materials may be formed into extremely thin linings of low permeability which serve as highly efficient cathodes.

The preferred anode, illustrated in Fig. 5, comprises essentially a consumable zinc wire 16 formed into a cylinder. Both the relatively small radii of the wire itself and of the cylinder contribute to the efficient freeing of the zinc from reaction products. The zinc powder 18 used to connect the zinc wire 16 electrically with the stud 17 has exhibited excellent electrical properties and eliminates the need for a soldered or spliced internal connection. This powder is not significantly consumed during the discharge of the cell. Certain advantages are obtained with anodes of the type shown in Fig. 8 wherein an amalgamable conductor relatively inert to the electrolyte is interwoven with the consumable wire. Specifically, the copper wire 72 provides a path for a current from any part of the zinc wire 71 even though the zinc wire itself becomes separated.

Several anodes are shown in Fig. 6 by way of example of the type of anode that may be used in the cell of the invention. In Fig. 6a the anode 31 comprises a stud 32 in electrical contact with and extending substantially along the longitudinal axis of a cylindrical body of zinc 33 the surface of which has been slotted as at 34. The anode 35 of Fig. 6b comprises a stud 36, a cylindrical body 37 of pressed zinc powder which is electrically connected to the stud 36 near the bottom of said stud. The anode 40 of Fig. 6c is similar to anode 35 but in addition a cap 41 has been placed around stud 42 which has been slotted. The cap 41 extends over the cylindrical body 43 of pressed zinc powder and minimizes air corrosion. In Fig. 6d the anode 45 comprises a single length of zinc wire which is wound into a helix 46 and then bent back through the helix 46 to form a stud 47. For best results the anode is amalgamated. About 3% by weight of mercury has been found to be satisfactory.

The electrolyte used in the cell of the invention is of the conventional alkaline paste type. A preferred electrolyte comprises sodium hydroxide, distilled water, zinc oxide, and a minor amount of cornstarch to maintain the electrolyte in the form of a gel.

What is claimed is:

1. An air-depolarized primary galvanic cell comprising a metallic container having apertures therein for admission of air, an air-depolarizable carbon cathode lining the interior walls of said container and substantially filling said apertures, a separator adjacent said cathode, an immobilized aqueous alkaline electrolyte in said container, a consumable zinc anode of coiled zinc wire immersed in said electrolyte and electrically connected to a metal stud, and an impervious closure for said container having an electrical terminal thereon, said stud being in electrical contact with said terminal.

2. An air-depolarized primary galvanic cell comprising a metallic container having apertures therein for admission of air, an air-depolarizable carbon cathode lining the interior walls of said container and substantially filling said apertures, a separator adjacent said cathode, an immobilized aqueous alkaline electrolyte in said container, a consumable zinc anode of zinc wire cylindrically wound around and electrically connected to a metal stud, said anode being immersed in said electrolyte, and an impervious closure for said container having an electrical terminal thereon, said stud being in electrical contact with said terminal.

3. An air-depolarized primary galvanic cell comprising a metallic container having apertures therein for admission of air, an air-depolarizable carbon cathode lining the interior walls of said container and substantially filling said apertures, a separator adjacent said cathode, an immobilized aqueous alkaline electrolyte in said container, a consumable zinc anode of zinc wire cylindrically wound around a metal stud, said zinc wire being electrically connected to said stud by compressed zinc powder, said anode being immersed in said electrolyte, and an impervious closure for said container having an electrical terminal thereon, said stud being in electrical contact with said terminal.

4. An air-depolarized primary galvanic cell comprising a metallic container having apertures therein for admission of air, an air-depolarizable carbon cathode lining the interior walls of said container and substantially filling said apertures, a separator adjacent said cathode and extending along the bottom of said cell from said carbon lining toward the center of said cell, an immobilized aqueous alkaline electrolyte in said container, a consumable zinc anode of zinc wire cylindrically wound around a metal stud, said zinc wire being electrically connected to said stud by compressed zinc powder, said anode being immersed in said electrolyte, and an imprevious closure for said container having an electrical terminal thereon, said stud being in electrical contact with said terminal.

5. An air-depolarized primary galvanic cell comprising a metallic container having apertures therein for admission of air, an air-depolarizable carbon cathode lining the interior walls of said container and substantially filling said apertures, a separator adjacent said cathode, an immobilized aqueous alkaline electrolyte in said container, a consumable zinc anode of coiled zinc wire immersed in said electrolyte and electrically connected to a metal stud, an amalgamable conductor inert to said electrolyte in electrical contact with said wire and said stud, and an impervious closure for said container having an electrical terminal thereon, said stud being in electrical contact with said terminal.

6. An air-depolarized primary galvanic cell comprising a metallic container having apertures therein for admission of air, an air-depolarizable carbon cathode lining the interior walls of said container and substantially filling said apertures, a separator adjacent said cathode, an immobilized aqueous alkaline electrolyte in said container, a consumable zinc anode of coiled zinc wire immersed in said electrolyte and electrically connected to a metal stud, a copper wire in electrical contact with said wire and said stud, and an impervious closure for said container having an electrical terminal thereon, said stud being in electrical contact with said terminal.

7. An air-depolarized primary galvanic cell comprising a metallic container having apertures therein for admission of air, an air-depolarizable carbon cathode lining the interior walls of said container and substantially filling said apertures, a separator adjacent said cathode and extending from said carbon lining toward the center of said cell to enclose at least partially the anode of said cell, a consumable zinc anode of zinc wire cylindrically wound around a metal stud, said zinc wire being electrically connected to said stud by compressed zinc powder, said anode being immersed in said electrolyte, and an impervious closure for said container having an electrical terminal thereon, said stud being in electrical contact with said terminal.

8. In an alkaline primary galvanic cell a metal anode assembly comprising a substantially cylindrical body formed of a plurality of coils of a conductive metal, said body being disposed in electrical contact with a stud.

9. In an alkaline primary galvanic cell a metal anode assembly comprising a substantially cylindrical body formed of a plurality of coils of a conductive metal, said body being connected electrically to a stud by a mass of compressed conductive metallic powder.

10. In an alkaline primary galvanic cell a metal anode assembly comprising a substantially cylindrical body formed of a plurality of coils of a conductive metal, said body being connected electrically to a stud by a mass of compressed powder of said conductive metal.

References Cited in the file of this patent

UNITED STATES PATENTS

| | | |
|---|---|---|
| 653,590 | Post | July 10, 1900 |
| 2,505,876 | Baker | May 2, 1950 |
| 2,562,215 | Ruben | July 31, 1951 |
| 2,597,116 | Marsal et al. | May 20, 1952 |
| 2,597,119 | Schumacher et al. | May 20, 1952 |
| 2,605,298 | Marsal | July 29, 1952 |
| 2,641,623 | Winckler et al. | June 9, 1953 |

FOREIGN PATENTS

| | | |
|---|---|---|
| 882,206 | France | Feb. 22, 1953 |